United States Patent [19]

Mottate

[11] Patent Number: 4,664,535
[45] Date of Patent: May 12, 1987

[54] TRACK GROOVE OF BALL BEARING FOR RECTILINEAR MOTION

[75] Inventor: Tatsuo Mottate, Tokyo, Japan

[73] Assignee: Nippon Thompson Co., Ltd., Tokyo, Japan

[21] Appl. No.: 807,859

[22] Filed: Dec. 11, 1985

[30] Foreign Application Priority Data

Jun. 12, 1985 [JP] Japan .................................. 60-126357

[51] Int. Cl. .............................................. F16C 29/04
[52] U.S. Cl. ......................................... 384/55; 384/45
[58] Field of Search ...................... 308/6 R, 6 C, 6 A; 384/516, 450, 45, 55

[56] References Cited

U.S. PATENT DOCUMENTS 3,370,899  2/1968  Eklund ................................ 384/516
4,443,042  4/1984  Walter et al. ....................... 308/6 C Primary Examiner—Lenard A. Footland
Attorney, Agent, or Firm—Trexler, Bushnell, Giangiorgi & Blackstone, Ltd.

[57] ABSTRACT

There is a track groove of a ball bearing for a rectilinear motion comprising a track member, a slide member arranged to sandwich the track member and adapted to be rectilinearly slidable along the track member, track grooves formed in both side portions of the track member and of the slide members so as to face one another, and a number of balls rotatably inserted between the track grooves which face each other. The contact portion of the track groove with the ball is formed by two or more kinds of arcs having different radii. The ball comes into contact with a single arc under a light load and with a plurality of arcs under a heavy load. The radius of the arc near the contact center with the ball may be slightly larger than the radius of the ball and the other arcs may be larger than the central arc. Or, the large arc may be formed at a location near the contact center with the ball and the arcs smaller than this central arc may be formed at locations other than the contact center. The slide resistance of the bearing can be reduced with this simple constitution of the track groove consisting of a plurality of arcs.

3 Claims, 12 Drawing Figures

TRACK GROOVE OF BALL BEARING FOR RECTILINEAR MOTION

BACKGROUND OF THE INVENTION

1. Field of the Invention

The present invention relates to a track groove of a ball bearing for a rectilinear motion and, more particularly, to a shape of a track groove of the type which can make the slide resistance small while retaining rigidity.

2. Description of the Prior Art

The shape of the track groove of such a kind of bearing is mainly divided into a circular arc groove shape and a Gothic arch groove shape.

These two track groove shapes have a merit and a demerit in terms of the performance of the bearing, respectively, so that they are individually used in dependence on the conditions when they used.

Generally, when two elastic members I and II are come into contact with each other, they have two sets of curvatures [=1/radius] $(\rho I_1, \rho I_2)$ and $(\rho II_1, \rho II_2)$ which are perpendicular to each other at contact point. However, according to the Hertz's theory, the shape of the compressive contact surface is an ellipse and when it is assumes that the length of the major axis is 2a and the length of the minor axis is 2b, the values of a and b will be expressed by the following equations.

$$a = \mu \times \left[ \frac{3 \times P \times (\theta I_1 + \theta II_1)}{8 \times (\rho I_1 + \rho I_2 + \rho II_1 + \rho II_2)} \right]^{(\frac{1}{3})} \quad (I)$$

$$b = \nu \times \left[ \frac{3 \times P \times (\theta I_1 + \theta II_1)}{8 \times (\rho I_1 + \rho I_2 + \rho II_1 + \rho II_2)} \right]^{(\frac{1}{3})} \quad (II)$$

where, P is a compressive load and $\theta I$ and $\theta II$ are elastic constants of the elastic members I and II.

An arrangement of a bearing shown in FIG. 1 is substituted for equations (I) and (II).

$$\rho I_1 = \rho I_2 = 2/Da$$

$$\rho II_2 = -1/f \cdot Da$$

$$\rho II_1 = 1/\infty = 0$$

Also, when a Poisson's ratio 1/m assumes 0.3 and a modulus of direct elasticity E assumes $2.12 \times 10^6$ kg/cm$^2$, $$\theta I = \theta II = 4 \times (m^2 - 1)/m^2 \times E = 1.72 \times 10^6$$

Therefore, equations (I) and (II) will become $$a = \mu \times \left[ \frac{1.29 \times P \times Da \times 10^{-6}}{4 - (1/f)} \right]^{(\frac{1}{3})} \quad (III)$$

$$b = \nu \times \left[ \frac{1.29 \times P \times Da \times 10^{-6}}{4 - (1/f)} \right]^{(\frac{1}{3})} \quad (IV)$$

The values of $\mu$ and $\nu$ can be obtained from the value of the auxiliary variable [$=\cos \tau = 1/(4 \times f - 1)$] by way of the conversion table. $\mu$ is proportional to the auxiliary variable and $\nu$ is inversely proportional to the auxiliary variable.

From the above equations, there is the relationship among a, b and f such that both a and b increase with an increase in f.

When considering the situation of the elastic contact between the ball and the track groove on the basis of such a fundamental elastic theory, the shapes of conventional respective track grooves have a drawback such that, as shown in FIG. 2 (showing an example of a circular arc groove) and FIG. 3 (showing an example of a Gothic arch groove), there is a large difference between $d_1$ ad $d_2$ and the different slip of the ball or the like occurs due to the difference in peripheral velocity ($v_1 = (\frac{1}{2})d_1 w$, $v_2 = (\frac{1}{2})d_2 w$) between $d_1$ and $d_2$. In general, this phenomenon does not cause an increase in slide resistance such as to produce a serious problem because a lubricating material is interposed under many use conditions. However, such an increase amount is disadvantageous under the particularly severe conditions that are required for the drive portions of measuring instruments, bearings of the detecting portions, and the like where it is necessary to suppress the slide resistance to as small a value as possible.

SUMMARY OF THE INVENTION

It is an object of the present invention to solve the foregoing drawbacks in conventional track grooves and to provide a track groove of a ball bearing for a rectilinear motion in which an arc of the track groove which is come into contact with a ball is set so as to be changed in a stepwise manner in accordance with the load condition and the slide resistance is small when a practical load (light load or heavy load) is applied.

This object is accomplished by a track groove of a ball bearing for a rectilinear motion in which track grooves which face one another are formed in both side portions of a track member and of a slide member arranged so as to sandwich the track member, a number of balls are rotatably inserted between the respective track grooves which face each other, and the slide member is rectilinearly slidable along the track member.

The track groove of the present invention has either of the following features.

(1) Each contact portion where the track grooves formed in the track member and slide member come into contact with the balls is formed by at least two or more kinds of arcs. The ball comes into contact with a single arc under a light load and with a plurality of arcs under a heavy load.

(2) Among the arcs formed in the track groove, the arc of a radius which is slightly larger than a radius of the ball is formed at least at a location near the contact center with the ball and the arcs larger than the arc near the contact center are formed at locations other than the portion near the contact center.

(3) Among the arcs formed in the track groove, the large arc is formed at least at a location near the contact center with the ball and the arcs smaller than the arc near the contact center are formed at locations other than the portion near the contact point.

According to the track groove of the present invention, the groove (first track groove) near the contact center with the ball and the groove portion (second or third track groove) other than the first track groove are formed by different arcs. In other words, under the ordinary use condition whereby it is intended to prevent the influence of the differential slip or revolving flip of the ball, the larger arc comes into contact with the ball, thereby suppressing the increased ratio of the contact width to reduce the difference between $R_1$ and $R_2$. In this manner, it is possible to provide a bearing in which the slide resistance is small and the reduction in rigidity is not caused under the other conditions.

The working technology to form a plurality of arcs in the track groove is not so difficult. Therefore, it is possible to easily and cheaply provide a ball bearing for a rectilinear motion with a small slide resistance.

The above and other objects, features and advantages of the present invention will be more apparent from the following detailed description in conjunction with the accompanying drawings.

DETAILED DESCRIPTION OF THE PREFERRED EMBODIMENTS

Embodiments of the present invention will be described in detail hereinbelow with reference to the drawings.

Figure 4A:
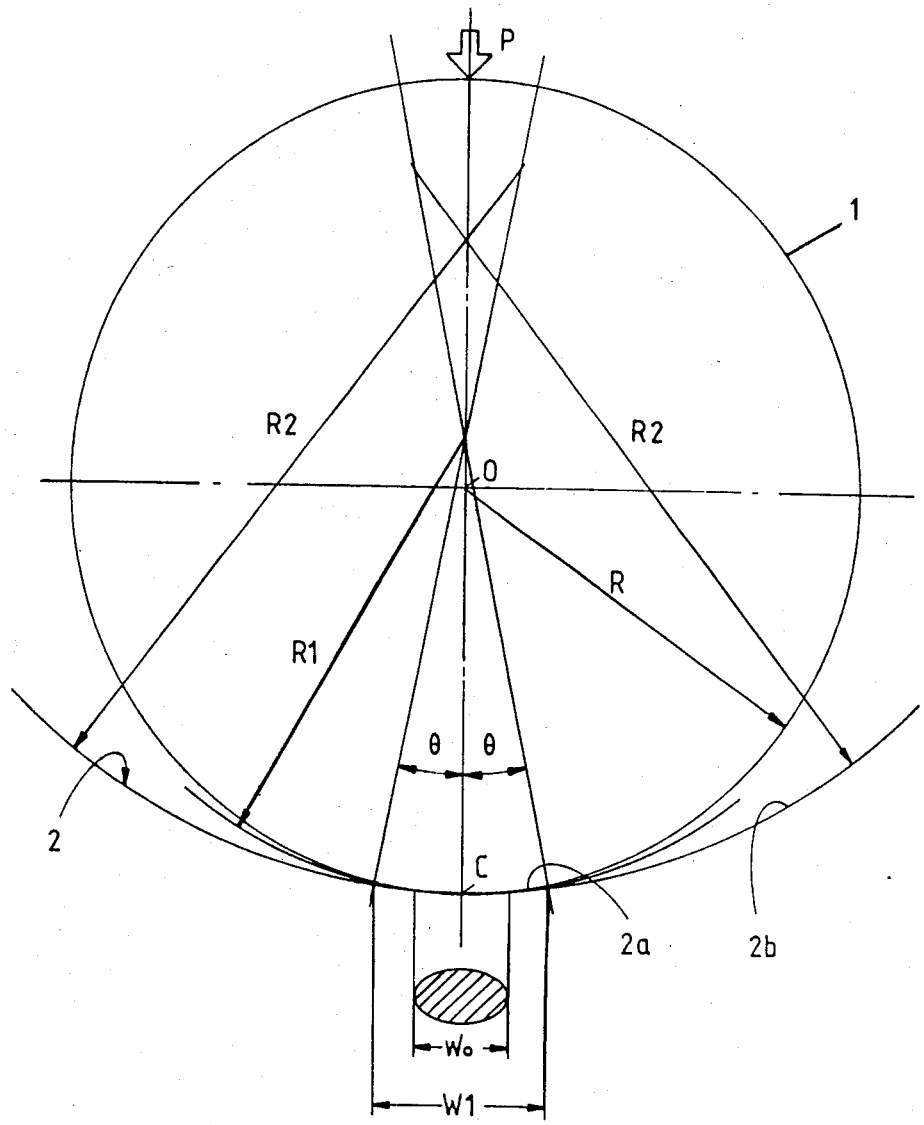
FIGS. 4A to 4E are enlarged diagrams of the ball and track groove illustrating embodiments of the present invention, respectively.

FIG. 4A is an enlarged diagram of a ball 1 and a track groove 2 showing the first embodiment of the present invention. In FIG. 4A, the track groove 2 consists of a first track groove 2a at a location near the contact center C with the ball 1 and a second track groove 2b at a location other than the center C. The first track groove is formed by an arc having a radius $R_1$ smaller than a radius $R_2$ of the arc of the second track groove. The value of $R^1$ is set to be slightly larger than a radius R of the ball. Under a light load, the ball 1 comes into contact with the small arc 2a of the first track groove. Under a heavy load, the ball comes into contact with the small arc 2a of the first track groove together with the large arc 2b of the second track groove at a location outside the groove. As the contact between the ball and the large arc starts, the increased ratio of the contact width $W_0$ between the ball 1 and the track groove 2 to the load decreases, so that an increase in differential slip is small. As mentioned above, there is a relation of $R < R_1 < R_2$ among the radii of the ball 1 and the small and large arcs. In this example, the respective values are as follows:

Diameter $D_a$ of the ball $1 = 5.556$ mm $R = D_a/2 = 2.778$ mm $R_1 = 0.56 \times D_a = 3.11$ mm $R_2 = 0.70 \times D_a = 3.89$ mm $\theta = 6.6°$ The value of $\theta$ is not limited to 6.6°. In addition, the value of f of 0.56 or 0.70 may be determined within a general range of about 0.5 to 0.7 in accordance with the use conditions.

Figure 4B:
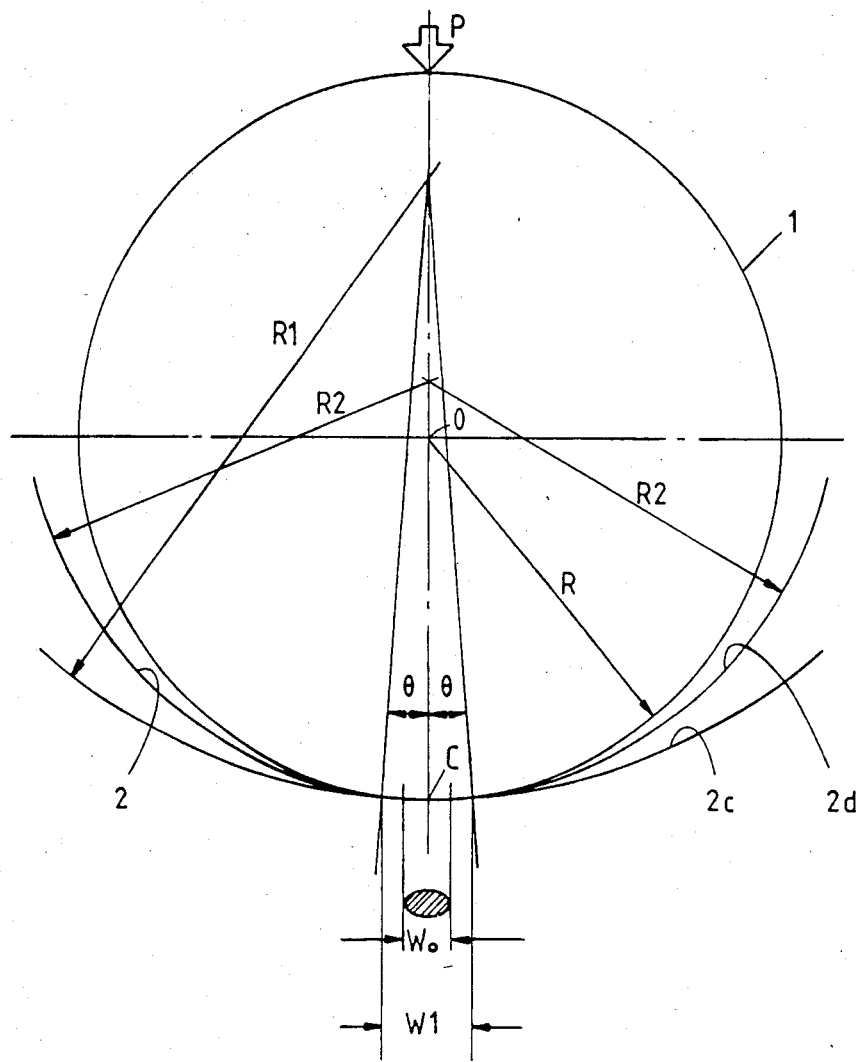

FIG. 4B is an enlarged diagram of the ball 1 and the track groove 2 showing the second embodiment of the invention. Although the first embodiment of FIG. 4A intends to reduce the slide resistance when a heavy load is applied, the second embodiment of FIG. 4B intends to decrease the slide resistance when a light load is applied. Practically speaking, the first track groove of the track groove 2 is formed by a large arc 2c of the radius $R_1$ and the second track groove 2d is formed by an arc of the radius $R_2$ smaller than the first track groove. With such a constitution, the arc of the track groove at a location near the contact center C with the ball 1 is largely formed, so that the increased ratio of the contact width $W_0$ to the load under a light load is suppressed, thereby reducing the differential slip or the like. There is a relation of $R < R_2 < R_1$ among the radii of the ball and the arcs.

Figure 4C:
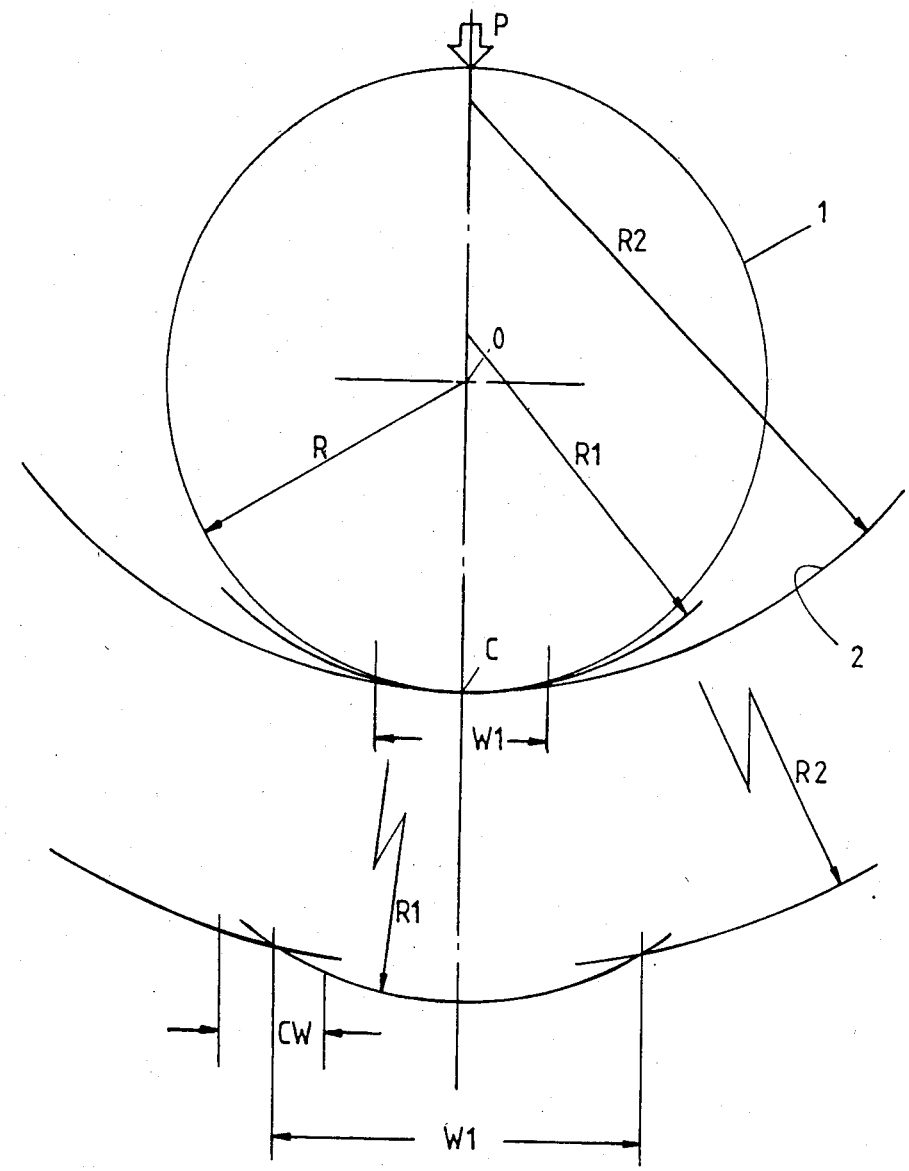

FIG. 4C likewise illustrates the third embodiment of the invention. In the foregoing first and second embodiments of FIGS. 4A and 4B, the two kinds of adjacent arcs of different radii of $R_1$ and $R_2$ are formed in a manner such that their centers are located on the same straight line passing through each boundary point between those two arcs so as to prevent a border line from being formed between the arcs. However, according to the third embodiment of FIG. 4C, the centers of the arcs are located on the straight line passing through the contact center C and the center O of the ball 1. Therefore, the border line clearly appears between the adjacent arcs having different radii of $R_1$ and $R_2$. The convex (or concave) portion corresponding to that border line is formed as a correction groove of a flat or arc surface without a boundary line. The width CW of the correction groove is preferably set to be as narrow as possible. In FIG. 4C, there is a relation of $R < R_1 < R_2$.

Figure 4D:
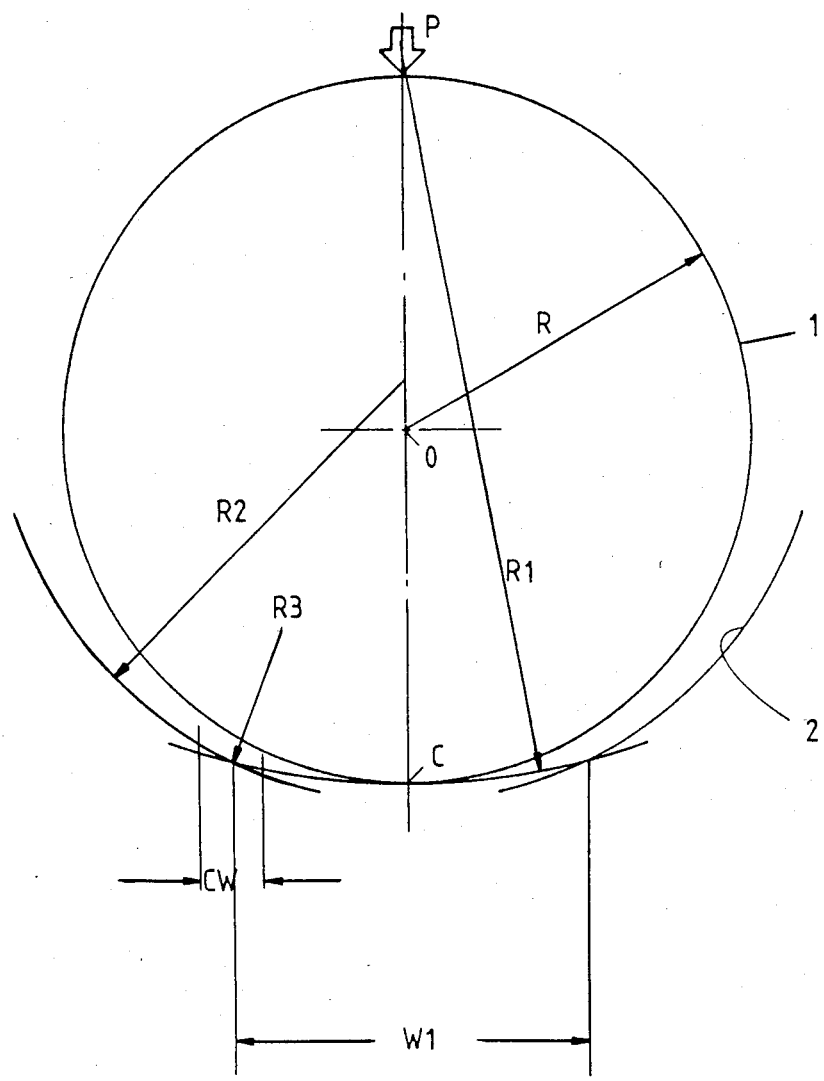

FIG. 4D shows the fourth embodiment of the invention. In FIG. 4C, the arc near the contact center C with the ball 1 is small. On the contrary, in FIG. 4D, the arc near the contact center C is large. Namely, there is a relation of $R < R_2 < R_1$. In addition, the correction groove is formed by an arc having a radius $R_3$.

Figure 4E:
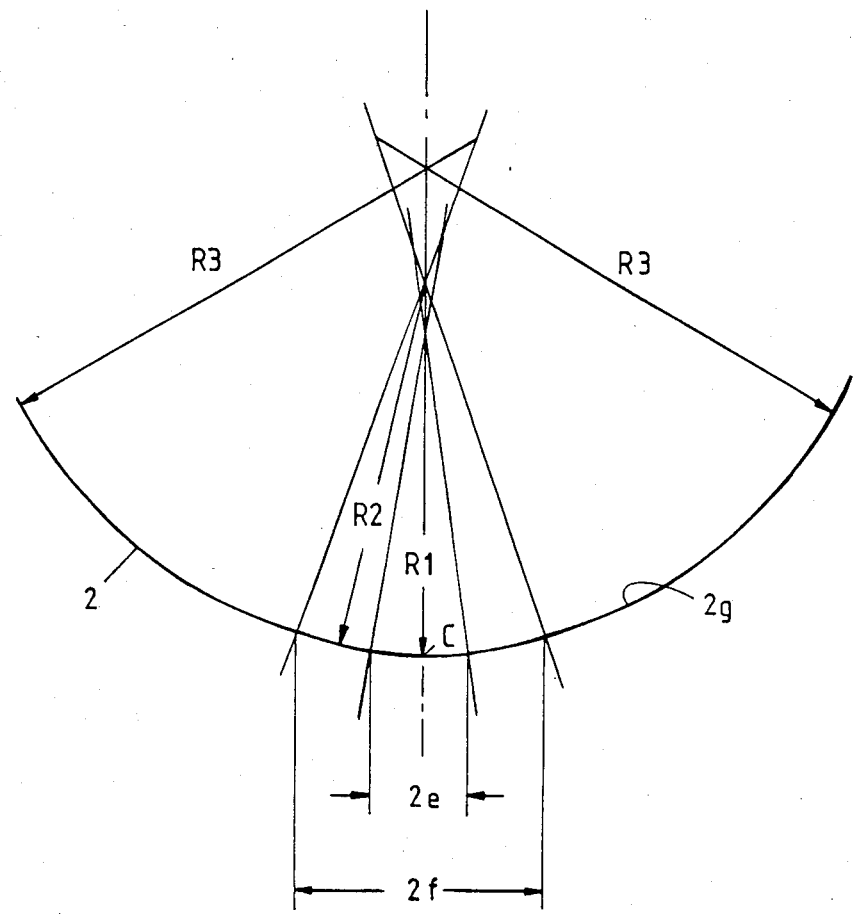

FIG. 4E shows the fifth embodiment of the invention, in which the track groove 2 is formed by the first 2e, second 2f and third 2g track grooves consisting of three kinds of arcs having the radii of $R_1$, $R_2$ and $R_3$. In the example shown in FIG. 4E, there is a relation of $R_1 < R_2 < R_3$; however, there may be an opposite relation of $R_1 > R_2 > R_3$.

Figure 3:
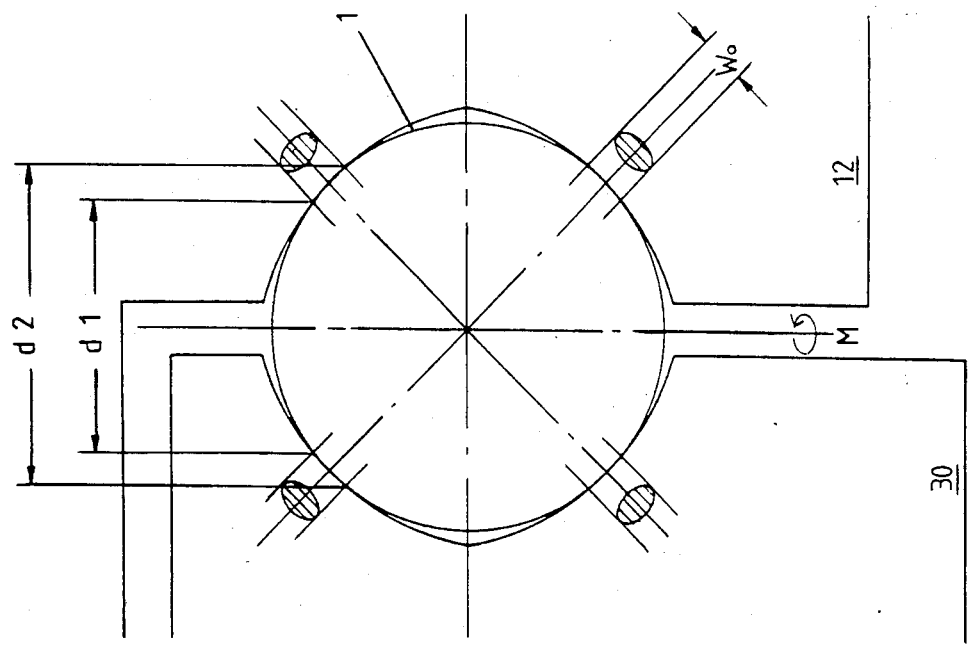
FIG. 3 is a diagram showing the differential slip in a Gothic arch groove.
Figure 5:
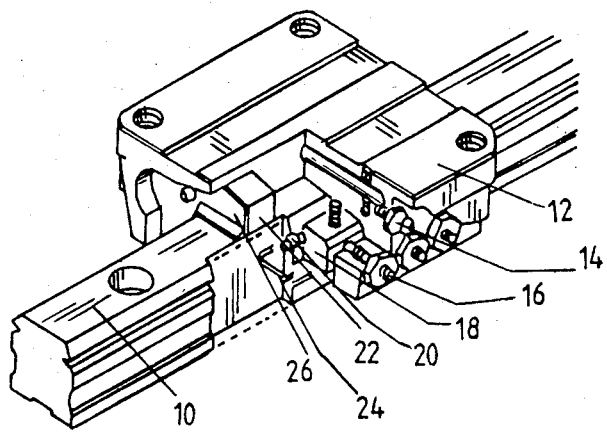
FIG. 5 is a perspective view with a part cut away showing an example of a ball bearing for a rectilinear motion with respect to the Gothic arch groove.

FIG. 5 illustrates an example of a ball bearing for a rectilinear motion of a Gothic arch groove to which the invetion is applied. As shown in FIG. 3, this groove has two contact points in one track groove, so that the number of arcs, for example, is four. In FIG. 5, reference numeral 10 denotes a track rail; 12 is a casing; 14 a greese nipple; 16 a pressurized adjusting screw; 18 a bearing plate; 20 a steel ball; 22 a side plate; 24 a steel ball holding band; and 26 a sealing member.

Figure 2:
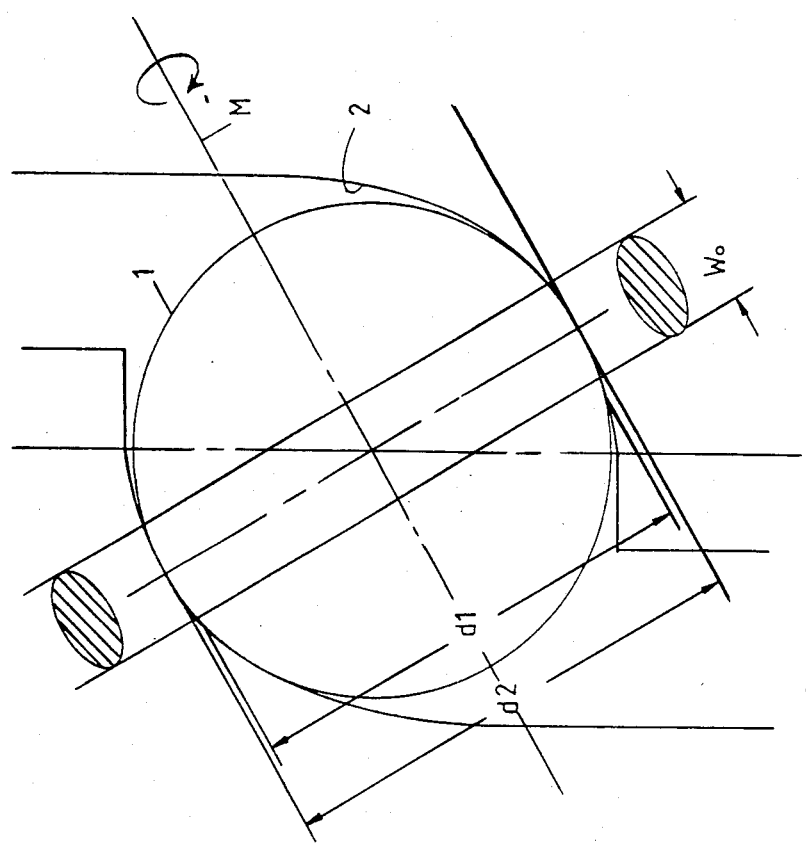
FIG. 2 is a diagram showing the differential slip in a circular arc groove.
Figure 6A:
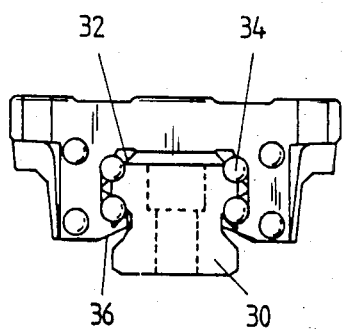
FIGS. 6A and 6B are diagrams showing an example of a ball bearing for a rectilinear motion with regard to the circular arc groove.
Figure 6B:
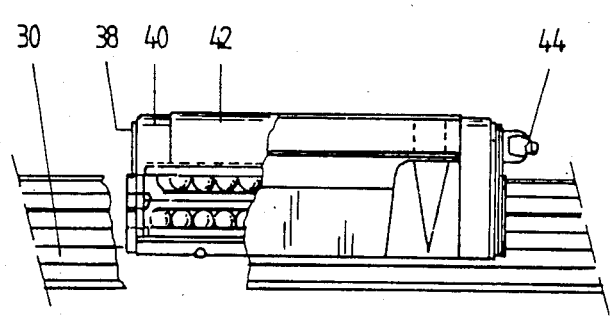

FIGS. 6A and 6B illustrate an example of a ball bearing for a rectilinear motion of a circular arc groove to which the invention is applied. As shown in FIG. 2, this groove has a single contact point in one track groove, so that the number of arcs, for example, is two. In the diagrams, reference numeral 30 denotes a track base; 32 is a holding device; 34 a series of load balls; 36 a side sealing member; 38 an end sealing member; 40 an end plate; 42 a bearing casing; and 44 a grease nipple.

Figure 1:
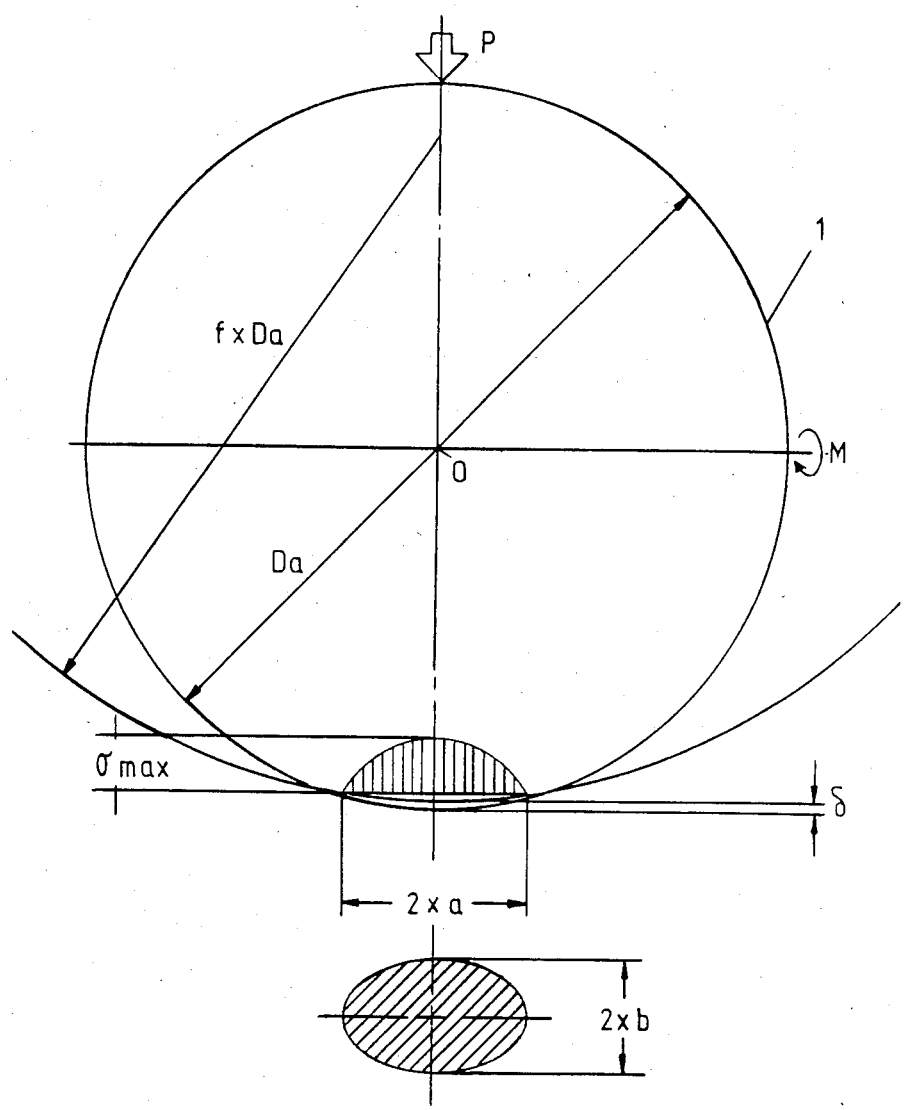
FIG. 1 is a diagram showing the relationship between the arrangement of a bearing and Hertz's theory with regard to the present invention.

FIG. 1 is a diagram showing the relation between the arrangement of a bearing regarding the present invention and Hertz's theory.

FIG. 2 is a diagram showing the differential slip in a circular arc groove. The difference of contact distances of $d_1$ and $d_2$ occurs between the ball 1 and the track groove 2 with regard to the center of the rotary axis, so that the differential slip occurs due to the difference of the peripheral velocities.

FIG. 3 is a diagram showing the differential slip in a Gothic arch groove. Similarly to FIG. 2, the difference of contact distances of $d_1$ and $d_2$ is caused, so that the differential slip occurs due to the difference of the peripheral velocities.

Figure 7:
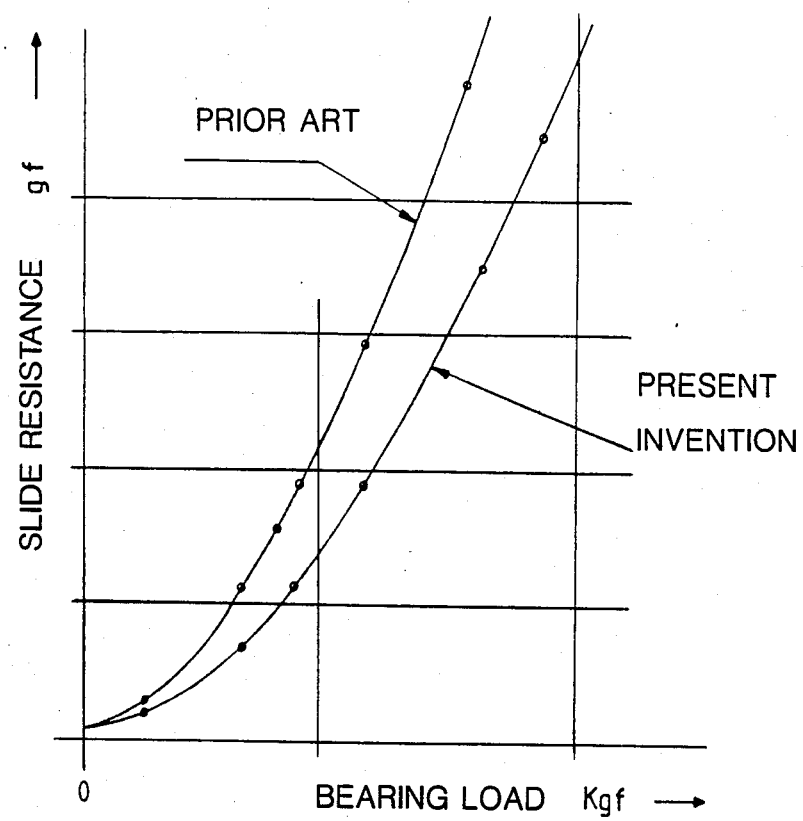
FIG. 7 is a graph showing the results of experiments regarding the track groove of the invention and a conventional example.
Figure 7:
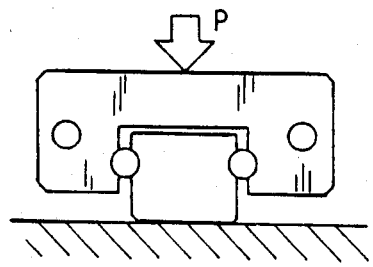

FIG. 7 is a graph showing the results of experiment of the slide resistance to the load applied to the bearing according to the present invention and a conventional example. In this experiment, the bearing of the type shown in FIG. 5 was used. It can be seen from this graph that the present invention has the effect such that the slide resistance can be reduced by about 30%.

The present invention is not limited to the bearings shown in FIGS. 5 and 6A and 6B but may be applied to various kinds of other similar bearings such as a ball bushing bearing, a ball spline bearing, and the like.

As described above, the track groove of a ball bearing for a rectilinear motion of the present invention has the following effects.

(1) A ball bearing for a rectilinear motion having a small slide resistance can be provided in accordance with the condition when the bearing is used.

(2) The respective track grooves may be formed merely by a plurality of arcs, so that the ball bearing to which the invention is applied can be easily manufactured.

(3) The track groove of the invention can be easily worked and the other parts than the track groove are unnecessary, so that the ball bearing to which the invention is applied can be cheaply manufactured.

Although the present invention has been shown and described with respect to preferred embodiments, various changes and modifications which are obvious to a person skilled in the art to which the invention pertains are deemed to lie within the spirit and scope of the invention.

What is claimed is:

1. A track groove of a ball bearing for a rectilinear motion comprising:
    a rectilinear track member;
    a rectilinear slide member arranged so as to sandwich said rectilinear track member;
    rectilinear track grooves formed in both side portions of said rectilinear track member and of said rectilinear slide member so as to face one another; and
    a number of balls rotatably inserted between said respective rectilinear track grooves which face each other;
    said slide member being rectilinearly slidable along said track member; characterized in that
    a contact area near a contact center in each of said track grooves, in which area the track groove can contact with one of said balls, is defined by at least two or more kinds of arcs, and is formed so as to be generally symmetric in relation with a line connecting a center of said ball with said contact center, each of said track groove including means defining an arc of relatively small diameter symmetric about said center line and means defining arcs of relatively large diameter outwardly of said arc of relatively small diameter and symmetric about said center line; and that
    said arc defining means coact with each ball such that the ball comes into contact with a single arc immediately near the contact center when a light load is applied, while said ball comes into contact with a plurality of arcs when a heavy load is applied due to elastic deformations of said ball and track groove.

2. A track groove according to claim 1, wherein among said arcs formed in said track groove, at least the arc at a location near the contact center with the ball is formed so that its radius is slightly larger than a radius of the ball, and the arcs at locations other than the portion near said contact center are formed so as to have larger radii than the radius of the arc near said contact center.

3. A track groove of a ball bearing for a rectilinear motion comprising: a track member; a slide member arranged so as to sandwich said track member; track grooves formed in both side portions of said track member and of said slide member so as to face one another; and a number of balls rotatably inserted between said respective track grooves which face each other; said slide member being rectilinearly slidable along said track member, wherein each contact portion of said track grooves formed in said track member and slide member with the ball is formed by at least two or more kinds of arcs, and the ball is come into contact with one of said arcs under a light load and with said plurality of arcs under a heavy load, among said arcs formed in said track groove, at least the large arc is formed at a location near the contact center with the ball, and the arcs smaller than said arc near said contact center are formed at locations other than the portion near said contact center.

* * * * *